United States Patent
Chen et al.

(10) Patent No.: US 10,369,511 B2
(45) Date of Patent: Aug. 6, 2019

(54) FILTER ELEMENT AND GAS PURIFICATION DEVICE COMPRISING A FILTER ELEMENT

(71) Applicant: KONINKLIJKE PHILIPS N.V., Eindhoven (NL)

(72) Inventors: Shuang Chen, Eindhoven (NL); Weizhong Chen, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 184 days.

(21) Appl. No.: 15/533,393

(22) PCT Filed: Dec. 16, 2015

(86) PCT No.: PCT/EP2015/080056
§ 371 (c)(1),
(2) Date: Jun. 6, 2017

(87) PCT Pub. No.: WO2016/097027
PCT Pub. Date: Jun. 23, 2016

(65) Prior Publication Data
US 2018/0001251 A1    Jan. 4, 2018

(30) Foreign Application Priority Data

Dec. 17, 2014 (WO) ............... PCT/CN2014/094035
Jan. 26, 2015 (EP) ...................................... 15152438

(51) Int. Cl.
*B01D 53/04* (2006.01)
*B01D 53/02* (2006.01)

(52) U.S. Cl.
CPC ......... *B01D 53/0454* (2013.01); *B01D 53/02* (2013.01); *B01D 53/04* (2013.01);
(Continued)

(58) Field of Classification Search
CPC ........................... B01D 53/04; B01D 53/0454
(Continued)

(56) References Cited

U.S. PATENT DOCUMENTS 3,340,680 A * 9/1967 Fields ...................... A61L 9/01
422/4
4,737,173 A    4/1988 Kudirka
(Continued)

FOREIGN PATENT DOCUMENTS

CA    1162904 A    2/1984
EP    2113295 A1    11/2009
(Continued)

OTHER PUBLICATIONS

Li Jing, Li Zhong, Liu Bing, Xia Qibin and Xi Hongxia, Effect of Relative Humidity on Adsorption of Formaldehyde on Modified Activated Carbons, Chinese Journal of Chemical Engineering, 16(6) 871-875 (2008).

*Primary Examiner* — Robert A Hopkins

(57) ABSTRACT

A filter element (1) for use in a gas purification device (100) is disclosed. It comprises a substrate (10) and a filter layer (20) covering an exterior surface of the substrate (10). The substrate (10) comprises material for containing chemicals (30) effective to remove gas pollutants from a gas. The material of the filter layer (20) is hydrophilic to adsorb liquid solution adsorbents effective in removing gas pollutants from a gas, and the exterior surface of the substrate (10) covered by the filter layer (20) is hydrophobic.

20 Claims, 1 Drawing Sheet

(52) U.S. Cl.
CPC .... *B01D 2253/25* (2013.01); *B01D 2253/304* (2013.01); *B01D 2253/3425* (2013.01); *B01D 2258/06* (2013.01); *B01D 2259/40092* (2013.01); *B01D 2259/4508* (2013.01)

(58) Field of Classification Search
USPC .................................................. 55/522, 524
See application file for complete search history.

(56) References Cited

U.S. PATENT DOCUMENTS

| | | |
|---|---|---|
| 4,892,719 A | 1/1990 | Gesser |
| 2003/0041733 A1 | 3/2003 | Seguin |
| 2006/0130451 A1 | 6/2006 | Ding |
| 2008/0135060 A1 | 6/2008 | Kuo |
| 2013/0095996 A1 | 4/2013 | Buelow |
| 2016/0023187 A1 | 1/2016 | Hedlund |

FOREIGN PATENT DOCUMENTS

| | | | |
|---|---|---|---|
| JP | 09079631 A | * | 3/1997 |
| RU | 2142326 C1 | | 12/1999 |
| SU | 1095967 A1 | | 6/1984 |

* cited by examiner

FILTER ELEMENT AND GAS PURIFICATION DEVICE COMPRISING A FILTER ELEMENT

This application is the U.S. National Phase application under 35 U.S.C. § 371 of International Application No. PCT/EP2015/080056, filed on Dec. 16, 2015, which claims the benefit of International Application No. PCT/CN2014/094035 filed on Dec. 17, 2014 and International Application No. 15152438.6 filed on Jan. 26, 2015. These applications are hereby incorporated by reference herein.

FIELD OF THE INVENTION

The invention relates to a filter element for use in a gas purification device, comprising a substrate and a filter layer covering an area of the substrate which is at least a portion of an exterior surface of the substrate, wherein the filter layer comprises material for containing chemicals effective to remove gas pollutants from a gas. Furthermore, the invention relates to a device for purifying a gas, comprising a filter element as mentioned and means for realizing a flow of the gas along the filter layer of the filter element during operation.

BACKGROUND OF THE INVENTION

Indoor air quality is an important issue which is closely related to human health and comfort. Pollution of indoor air constitutes a significant risk factor for various health problems in view of the fact that many people spend most of their time, for example, more than 90% of their time, indoors. In general, air pollutants can be one or more of particle pollutants, gas pollutants and microorganisms. Particle pollutants can be removed from air by applying an appropriate air purification system such as a system which is equipped with high efficiency HEPA filters. Microorganisms which are usually present on the particles can also be removed from air in that way.

The invention relates to the field of removing gas pollutants from air or another gas that needs to be purified. Gas pollutants include both organic gases and inorganic gases. Well-known examples of organic gas pollutants are formaldehyde and volatile organic compounds (VOCs) like benzene, toluene and xylene. Inorganic gas pollutants are gases like $CO$, $CO_2$, $NO_2$, $SO_2$ and $NH_3$. It is common use to apply an activated carbon filter for removing gas pollutants from air. Also, it is known to apply a photocatalytic oxidation method.

US 2008/135060 A1 discloses a filter element comprising a substrate coated with an acetoacetate-functional polymeric material that reacts with and removes aldehydes present in a gas such as air. The function of the filter elements is based on the fact that gaseous aldehydes such as formaldehyde, acetaldehyde and acrolein may be removed permanently from air or other gaseous environments or media such as tobacco smoke by contacting a gas containing one or more aldehydes with a filter element comprising a substrate, e.g. a filter support material, and a polymeric composition containing an acetoacetate residue, wherein the polymeric composition is selected from condensation polymers, addition polymers, epoxy resins, polysiloxanes, cellulose and cellulose esters.

Effective and simple removal of gas pollutants is realized when liquid solution adsorbents, i.e. liquid solutions containing suitable chemicals, are applied. However, the application of using a liquid in the process is limited due to a relatively small size of the gas-liquid contact area. Also, it may be disadvantageous to have increased humidity on the basis of the presence of the liquid, and the liquid may be difficult to recycle. It is known to increase effectiveness of the application of liquid solution adsorbents by providing a hydrophilic substrate such as a piece of paper for incorporating the adsorbents. However, one of the disadvantages of this method is that only the chemicals at the exterior surface of the substrate are involved in the reaction which is necessary for removal of gas pollutants, wherein most of the chemicals are present inside the substrate and cannot effectively join the reaction as a consequence thereof. Hence, when the surface chemicals have been reacted, the maximum lifetime of the filter element is reached. All in all, the filter element comprising the hydrophilic substrate involves many disadvantages, including low liquid reaction efficiency, short life time and waste of chemicals.

SUMMARY OF THE INVENTION

It is an object of the invention to provide a filter element which is improved with respect to the known filter elements for removing gas pollutants from a gas such as air by applying liquid solution adsorbents, in order to alleviate the problems associated with the known filter elements. The object of the invention is achieved by means of a filter element comprising a substrate and a filter layer covering an exterior surface of the substrate, wherein the substrate comprises material for containing chemicals effective to remove gas pollutants from a gas, wherein the material of the filter layer is hydrophilic to adsorb liquid solution adsorbents effective in removing gas pollutants from a gas, and wherein the exterior surface of the substrate covered by the filter layer is hydrophobic.

On the basis of the combination of a hydrophobic surface covered with a hydrophilic material, an advantageous effect is obtained when a drop of liquid solution adsorbents is applied to the filter element according to the invention. The fact is that the liquid drop will quickly spread out in the filter layer, forming a very thin liquid layer. As a consequence, all the chemicals can effectively join the reaction as intended. Furthermore, the filter element can easily be regenerated, namely by adding a new drop of liquid solution adsorbents. When the substrate is designed such as to have an open porous structure, the filter element involves only a small pressure drop, so that a relatively small fan suffices for generating a flow of a gas to be purified through the filter element. Thus, when a comparison is made between the filter element according to the invention and the known filter elements, it is found that the filter element according to the invention involves advantages such as a decrease of complexity of design, an increase of efficiency, a decrease of costs and possibly also a decrease of power consumption.

In general, it is advantageous for the substrate which is part of the filter element according to the invention, and which serves for supporting the filter layer of the filter element, to have a large surface area and a small pressure drop. In a practical embodiment, the substrate comprises a plurality of channels, wherein the filter layer covers at least a portion of the exterior surface of the substrate in the channels. For example, the substrate may have a honeycomb appearance by virtue of at least a portion of the channels having a hexagonal outline. The channels of the substrate may be non-straight channels, i.e. channels different from straight channels extending in a single longitudinal direction, in order to prolong the residence time of the gas to be purified in the filter element. It is important that the exterior surface of the substrate has a liquid-resistant property which is beneficial to the process of forming a thin spread-out liquid layer in the filter layer on the basis of a drop of liquid which is supplied to the filter layer. Examples of suitable liquid-resistant materials for use in the substrate are glass, metal, plastic and ceramics. Also, it is possible for the substrate to comprise liquid-resistant porous material such as $Al_2O_3$ foam. In such a case, due to the hydrophilic property of the filter layer, the liquid solution adsorbents are prevented from blocking the pores in the substrate.

The fact that the substrate has a liquid-resistant property, at least at a portion of the exterior surface thereof, implies that the substrate is not hydrophilic and practically does not absorb liquid at that portion of the exterior surface. In embodiments of the filter element of the invention, the substrate may have a liquid-proof property. According to another option, at least a portion of the area of the substrate as covered by the filter layer is hydrophobic. In that respect, it is noted that it is also possible for the substrate to be entirely made of hydrophobic material. In one embodiment, the substrate comprises a hydrophilic material such that only its exterior surface is hydrophobic. The exterior of the substrate may be coated with a hydrophobic material.

According to a practical option existing within the framework of the invention, the filter layer is a thin layer of hydrophilic coating applied to at least a portion of the exterior surface of the substrate. The function of the filter layer is to quickly adsorb the liquid solution adsorbents, such that a thin film is formed. It is noted that the liquid solution adsorbents may comprise water and (a) chemical(s) formulated according to targeted gas pollutants, which does not alter the fact that another liquid than water may be used. A suitable hydrophilic coating may be realized by coating the substrate with hydrophilic paint, by attaching a thin layer of hydrophilic polymer to the substrate, etc.

The invention also relates to a device for purifying a gas such as air, comprising a filter element with a hydrophilic filter layer and a substrate having a liquid-resistant property as described in the foregoing, and further comprising means such as a fan for realizing a flow of the gas along the filter layer of the filter element during operation. As already mentioned in the foregoing, the invention allows for easy regeneration of the filter element. Regeneration measures incorporated in the gas purification device can involve an application of indication means for indicating to a user information regarding the effective lifetime of the filter layer of the filter element. For example, a user may know that liquid solution adsorbents need to be supplied to the filter layer in case a particular light on the device is on, a sound is given when the device is activated, or another warning signal is produced. According to another option, a color change of the filter layer may serve as an indication of the lifetime status of the filter layer. For example, a chemical may be added to the filter layer, which reacts with gas pollutants and changes color as a result thereof. Providing an indication to the user is especially useful if regeneration involves actions from the user, particularly removing the filter element from the device, supplying a suitable quantity of liquid solution adsorbents to the filter layer of the filter element, for example through spraying, and putting the filter element back in place in the device. Hence, in such a case, it is practical for the filter element to be removably arranged in the device, which does not alter the fact that it is also possible to have a design of the device in which the filter element can be kept in place and yet be provided with the liquid solution adsorbents, in which case the actions of removing the filter element from the device and putting the filter element back in place in the device can be omitted.

In a more sophisticated embodiment of the gas purification device according to the invention, the device comprises a spraying arrangement for spraying a liquid on at least a portion of the filter layer of the filter element, so that a user does not need to use a separate spraying device. Furthermore, in this embodiment, it is possible to have automatic regeneration. To that end, the device may be furthermore equipped with a timer for activating the spraying arrangement at a predetermined interval frequency. Alternatively, the device may comprise suitable detecting and controlling means or the like for checking the effectiveness of the gas purifying process, wherein the spraying arrangement is automatically operated as soon as the effectiveness appears to be below a predetermined threshold. For instance, such detecting and controlling means may be adapted to check the effectiveness of the gas purifying process by comparing a content of gas pollutants of an outgoing gas flow with a content of the same gas pollutants of an incoming gas flow, and to activate the spraying arrangement in case the outcome of the comparison appears to be below a predetermined reference value while the content of gas pollutants of the incoming gas flow is above a predetermined reference value.

The device according to the invention may be equipped with a tank for containing liquid chemicals, wherein it is advantageous for the spraying arrangement to be connected to the tank. In the case of automatic regeneration, it is not necessary to indicate to the user that the lifetime of the filter layer has ended. Yet, assuming that a tank for containing liquid chemicals is present in the device, it is still useful to have indication means in the device, namely for indicating an empty status or a nearly empty status of the tank.

The invention is not restricted to the application of certain types of chemicals. In principle, all kinds of liquid solutions which are capable of removing one or more gas pollutants can be used with the filter element according to the invention. One example of a liquid solution is a liquid solution containing Tris(hydroxylmethyl)amino-methane, in a content in a range of 1% to 40%, which is known to be effective in removing formaldehyde from air.

The above-described and other aspects of the invention will be apparent from and elucidated with reference to the following detailed description of a practical embodiment of a filter element comprising a hydrophilic filter layer and a substrate having a liquid-resistant exterior surface, and of components of an air purifier including the filter element.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
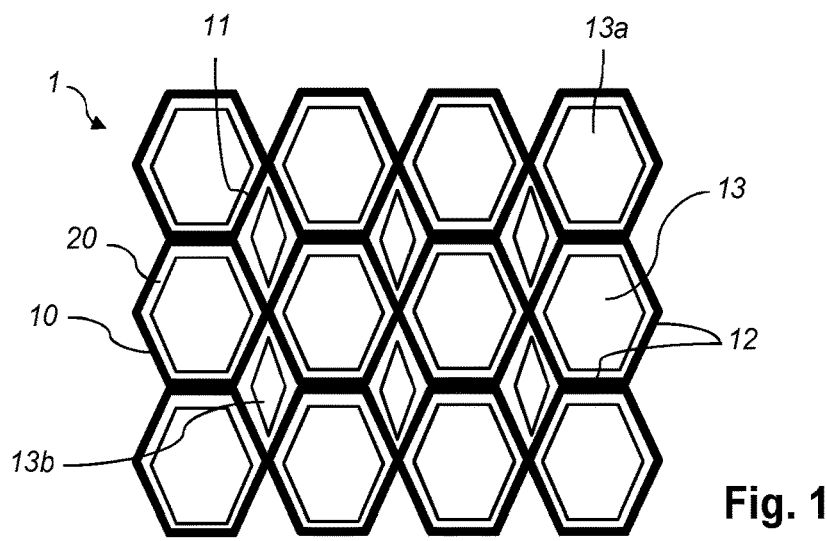
FIG. 1 diagrammatically shows a practical embodiment of a filter element according to the invention.

FIG. 1 diagrammatically shows a practical embodiment of a filter element 1 according to the invention. The filter element 1 comprises a substrate 10 and a filter layer 20 in the form of a thin layer of hydrophilic coating applied to an area 11 which is a portion of the exterior surface 12 of the substrate 10, i.e. a portion of the surface of the substrate 10 which is accessible from outside of the substrate 10, which includes the surface which is accessible in pores, holes, channels etc. as may be present in the substrate 10. In the diagrammatic representation of FIG. 1, the thickness of the filter layer 20 is depicted in an exorbitant large fashion with respect to the thickness of the substrate 10, for the sake of illustration of the presence of the filter layer 20 on the covered area 11 of the substrate 10.

In the shown example, the substrate 10 comprises a plurality of channels 13 for allowing gas to be purified to flow through the filter element 1. In order to have a most effective filter element 1, the exterior surface 12 of the substrate 10 is covered by the filter layer 20 in each of the channels 13. The exterior surface 12 of the substrate 10 is liquid-resistant in order to obtain effects as will be explained below. To this end, an outer layer of the substrate 10 may comprise one or more liquid-resistant materials such as glass, metal, plastic or ceramics, or the entire substrate 10 may be made of such materials.

The channels 13 may have any suitable outline. In the shown example, a number of channels 13 have a hexagonal outline, so that the substrate 10 has a honeycomb appearance. It is a well-known fact that a honeycomb structure is advantageous when it comes to having both a relatively large surface and a relatively small pressure drop. All channels 13 can have a hexagonal outline in order to obtain the honeycomb structure, but it is also possible to have a combination of hexagonal channels 13a and diamond-shaped channels 13b as shown. The channels 13 may be straight channels, but channels 13 comprising curves are also feasible within the framework of the invention.

The filter element 1 is suitable to be applied in a device which is intended to be used for purifying air or another gas. In such a device, a fan or the like is used for driving the gas to be purified through the filter element 1, for contacting the filter layer 20 of the filter element 1. Due to its hydrophilic property, the filter layer 20 is capable of adsorbing liquid solution adsorbents which are effective in removing gas pollutants from the gas flowing along the filter layer 20 during operation of the gas purification device. The filtering function of the filter element 1 is based on the fact that pollutants are entrained in the filter layer 20 and are reacted with the chemicals as present in the filter layer 20. As long as not all chemicals have been reacted, it is achieved that an outgoing gas flow of the filter element 1 contains less gas contaminants than an ingoing gas flow of the filter element 1. The liquid solution adsorbents stay on top of the exterior surface 12 of the substrate 10 in the form of a thin film, wherein, due to the liquid-resistant property of the substrate 10, it is avoided that the liquid solution adsorbents penetrate deeper into the substrate 10. Hence, the quantity of liquid solution adsorbents needed to have a functional state of the filter element 1 is considerably less than in case the substrate 10 would be hydrophilic as known in the art.

In order to reach satisfactory removal efficiency of the filter element 1, pore size of the filter element 1, which is determined by the cross-sectional size of the channels 13, is a very important factor. Small pore size filter elements will have better removal efficiency, but a larger pressure drop is obtained. On the other hand, filter elements with larger pore size will benefit in smaller pressure drop, but their removal efficiency will be decreased because the gas will not have full contact to the filter element. Therefore, the selection of a suitable pore size which involves satisfactory removal efficiency and an acceptable pressure drop is important.

In the following, a way of determining a suitable pore size is explained. As an example of an actual situation of purifying air in a room by means of a suitable device, i.e. an air purifier, it is assumed that the volume of the room is 50 $m^3$, and that the air purifier is able to clean the air in the room five times every hour, so that the flow rate of the filter element 1 needs to be 250 $m^3/h$. The size of a face area of the filter element 1 is assumed to be 0.1 $m^2$, while the thickness of the filter element 1 is assumed to be 30 mm. The air velocity is calculated to be 0.69 m/s (250÷0.1÷3600=0.69 m/s). Using the following formula, the residence time t of the gas molecules within the filter element 1 can be calculated, wherein c represents the porosity of the filter element 1 and is assumed to be 0.5, L represents the thickness of the filter element 1, and v represents the air velocity:

$$t = \varepsilon L/v = 0.5 \times 0.03/0.69 = 0.02 \text{ s}$$

The diffusion path Δ of the gas molecules is calculated by means of the following formula, wherein D represents the gas diffusion coefficient, which is assumed to be applicable to formaldehyde in this example, $D_{HCOH} = 1 \times 10^{-5}$ $m^2/s$:

$$\Delta = (4Dt)^{1/2} = (4 \times 10^{-5} \times 0.02)^{1/2} = 0.9 \text{ mm}$$

According to the calculation result, if the shape of the channels 13 of the filter element 1 is straight, then the ideal diameter of the channels 13, i.e. the ideal pore size, is 0.9 mm. If the channels 13 of the filter element 1 are not straight, the increased complexity of the air pathway allows larger pore size as long as the open pore of the filter element 1 extending all the way from one side of the filter element 1 to another is smaller than 0.9 mm.

An important issue in the field of filter elements for purifying air or another gas is the lifetime of the filter element. The filter element 1 according to the invention can be regenerated by supplying chemicals to the filter layer 20, which may be done in any suitable manner, for example, through spraying. In the following, it is explained how a regeneration interval can be calculated. As an example, it is assumed that the composition of the chemical adsorbent to be included in the filter layer 20 is 10% w/w $KHCO_3$/5% w/w $K_2CO_3$/10% w/w $KHCO_2$/25% w/w Tris-hydroxymethyl-amino-methane/50% w/w $H_2O$. In that case, the Tris supplied to the filter layer 20 is 12.5 g (ca. 0.1 mol) when the filter layer 20 is assumed to adsorb 50 g chemical adsorbent. On the basis of the fact that each $NH_2$ group helps to combine two formaldehyde gas molecules, it is found that 0.1 mol Tris adsorbs 0.2 mol (6000 mg) formaldehyde. This implies that in a 50 $m^3$ size room, in which the formaldehyde concentration is 0.1 $mg/m^3$, the filter element 1 is able to clean 60000 $m^3$ polluted air. Assuming that the air purifier is capable of emitting 200 $m^3/h$ clean air, this means that the filter element 1 can be used for 300 hours. When the pollution reaches a double level (0.2 $mg/m^3$), the effective lifetime of the filter element 1 is 150 hours. Based on this exemplary calculation, regeneration of the filter element 1 needs to take place every week or every two weeks, which is a practical and reasonable time interval.

In the example as described in the foregoing, the functional group to remove formaldehyde is $NH_2$. It is noted that other types of amine with NH groups are also suitable for formaldehyde removal.

It is beneficial to the effectiveness of the filter element 1 if a periodic regeneration system is provided with the filter element 1. A lifetime cycle of the filter element 1 is started by loading the hydrophilic filter layer 20 with functional gas removal adsorbents. After a predetermined period of time or on the basis of sensor feedback, a new dose of the adsorbents can be supplied to the filter layer 20 to start a new lifetime cycle and to keep the effectiveness at which the removal of gas pollutants takes place at a predetermined level throughout the entire lifetime of the filter element 1. On the basis of the fact that the design of the filter element 1 according to the invention allows for regeneration, problems associated with known filter elements, such as short lifetime and limited efficiency of removal of gas pollutants are effectively alleviated.

Figure 2:
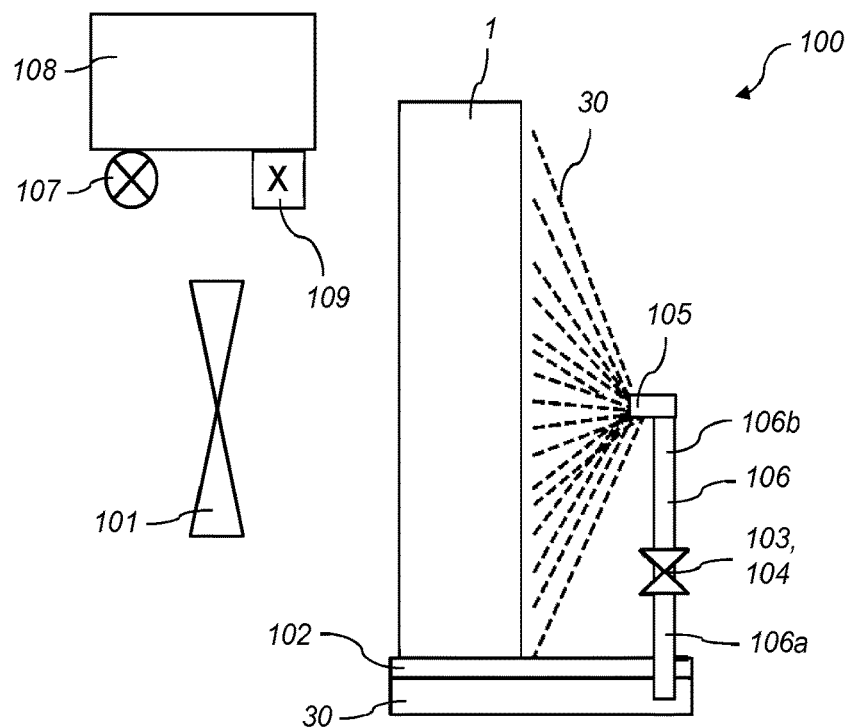
FIG. 2 diagrammatically shows components of an air purifier including the filter element.

FIG. 2 diagrammatically shows components of an air purifier 100 including the filter element 1 as described in the foregoing. In particular, besides the filter element 1, the air purifier 100 comprises a fan 101 for generating a flow of air through the filter element 1, a tank 102 for containing liquid solution adsorbents 30, a pump 103 with a control valve 104, a nozzle 105 to spray liquid solution adsorbents 30 on the filter element 1, and tubing 106 having a first section 106a for enabling the pump 103 with the control valve 104 to take liquid solution adsorbents 30 from the tank 102, and a second section 106b for enabling the pump 103 with the control valve 104 to supply liquid solution adsorbents 30 to the filter element 1 through the nozzle 105. According to this design, the air purifier 100 comprises a regeneration system which is adapted to regenerate the filter element 1 by taking liquid solution adsorbents 30 from the tank 102 and spraying those on the filter element 1, wherein the liquid solution adsorbents 30 are adsorbed by the filter layer 20 of the filter element 1 and form a thin film on the exterior surface 12 of the substrate 10 of the filter element 1 as explained in the foregoing. In FIG. 2, a spray of liquid solution adsorbents 30 is diagrammatically depicted by means of a group of dashed lines.

In the air purifier 100 as shown, regeneration of the filter element 1 takes place by activating the pump 103 with the control valve 104, assuming that the tank 102 is filled with liquid solution adsorbents 30. According to one feasible option, the pump 103 with the control valve 104 are activated manually by a user of the air purifier 100. To that end, the air purifier 100 may comprise a suitable button or the like, for operation by the user. In a basic embodiment of the air purifier 100, it is up to the user to the decide when regeneration of the filter element 1 should take place, namely by sensing the quality of the air in the surroundings of the air purifier 100 and/or taking into account a certain time interval. In a more sophisticated embodiment of the air purifier 100, an indicator 107 is provided for warning the user that it is time to have a regeneration action. The indicator 107 may be operated by means of a timer (not shown), or the air purifier 100 may be equipped with a controller 108 and at least one sensor 109 for checking whether the filter element 1 is effective to a predetermined extent and activating the indicator 107 when this appears not to be the case. The checking process as mentioned may take place in any suitable manner, and may involve detecting the content of gas pollutants in the outgoing flow of air and comparing the value as found to a threshold value, or detecting the content of gas pollutants in both the incoming flow and the outgoing flow of air and comparing a difference value as found to a threshold value. In an automatic embodiment, which is also feasible within the concept of the regeneration system as shown, the indicator 107 may be omitted. Instead of being adapted to provide a signal to the user, the controller 108 may be adapted to directly activate the pump 103 with the control valve 104 as soon as regeneration appears to be necessary on the basis of information relating to the effectiveness of the filter element 1 as received through the sensor 109.

Although it is preferred to allow for regeneration of the filter element 1 in a convenient manner, it is not necessary for an air purifier comprising the filter element 1 to comprise a regeneration system. As an alternative, the user can act to regenerate the filter element 1, namely by removing the filter element 1 from the air purifier, spraying the filter element 1 with liquid solution adsorbents 30 from a suitable spray can or the like, and putting the filter element 1 which is regenerated in this manner back in place in the air purifier. In respect of this alternative, the air purifier may be equipped with an indicator for helping a user with determining the right time for a regeneration action.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

In short, the invention relates to a filter element 1 for use in a device for purifying a gas, which filter element 1 comprises a substrate 10 and a filter layer 20 covering an area 11 of the substrate 10 which is at least a portion of an exterior surface 12 of the substrate 10. The filter layer 20 comprises material for containing chemicals effective to remove gas pollutants from a gas such as air. The material of the filter layer 20 is hydrophilic, while at least a portion of the area 11 of the substrate 10 as covered by the filter layer 20 is liquid-resistant. When a drop of liquid solution adsorbents 30 is applied to the filter element 1, the liquid drop will quickly spread out in the filter layer 20, forming a very thin liquid layer, so that all of the chemicals can be effectively used and regeneration of the filter element 1 is possible by supplying liquid solution adsorbents 30 to at least a portion of the filter layer 20 of the filter element 1.

The invention claimed is:
1. A filter element for use in a gas purification device, comprising:
a substrate; and
a filter layer covering an exterior surface of the substrate, wherein the filter layer comprises material for containing chemicals effective to remove gas pollutants from a gas, wherein the material of the filter layer is hydrophilic to adsorb liquid solution adsorbents effective in removing gas pollutants from a gas, further wherein the material of the filter layer comprises Tris(hydroxylmethyl)amino-methane and wherein the exterior surface of the substrate covered by the filter layer is hydrophobic.
2. The filter element according to claim 1, wherein the substrate comprises a plurality of channels, and wherein the filter layer covers at least a portion of the exterior surface of the substrate in the channels.

3. The filter element according to claim 2, wherein the substrate has a honeycomb appearance by virtue of at least a portion of the channels having a hexagonal outline.

4. The filter element according to claim 2, wherein the channels are non-straight channels, or channels different from straight channels, extending in a single longitudinal direction.

5. The filter element according to claim 1, wherein the substrate is entirely made of hydrophobic material.

6. A device for purifying a gas, comprising a filter element according to claim 1, and means for realizing a flow of the gas along the filter layer of the filter element during operation.

7. The device according to claim 6, wherein the filter element is removably arranged in the device.

8. A filter element for use in a gas purification device, comprising:
   a substrate; and
   a filter layer covering an exterior surface of the substrate, wherein the filter layer comprises material for containing chemicals effective to remove gas pollutants from a gas, wherein the material of the filter layer is hydrophilic to adsorb liquid solution adsorbents effective in removing gas pollutants from a gas, wherein the exterior surface of the substrate covered by the filter layer is hydrophobic, and further wherein the substrate comprises a hydrophilic material such that only its exterior surface is hydrophobic.

9. The filter element according to claim 8, wherein the material of the filter layer comprises Tris(hydroxylmethyl) amino-methane.

10. The filter element according to claim 8, wherein the filter layer comprises a hydrophilic polymer.

11. The filter element according to claim 8, wherein the substrate comprises a plurality of channels, and wherein the filter layer covers at least a portion of the exterior surface of the substrate in the channels.

12. The filter element according to claim 11, wherein the substrate has a honeycomb appearance by virtue of at least a portion of the channels having a hexagonal outline.

13. A device for purifying a gas, comprising a filter element according to claim 8, and means for realizing a flow of the gas along the filter layer of the filter element during operation.

14. A device for purifying a gas, comprising:
    a filter element that comprises a substrate and a filter layer covering an exterior surface of the substrate, wherein the filter layer comprises material for containing chemicals effective to remove gas pollutants from a gas, wherein the material of the filter layer is hydrophilic to adsorb liquid solution adsorbents effective in removing gas pollutants from a gas, and wherein the exterior surface of the substrate covered by the filter layer is hydrophobic;
    means for realizing a flow of the gas along the filter layer of the filter element during operation; and
    means for indicating information regarding an effective lifetime of the filter layer of the filter element to a user.

15. The device for purifying a gas according to claim 14, wherein the filter element is removably arranged in the device.

16. A device for purifying a gas, comprising:
    a filter element that comprises a substrate and a filter layer covering an exterior surface of the substrate, wherein the filter layer comprises material for containing chemicals effective to remove gas pollutants from a gas, wherein the material of the filter layer is hydrophilic to adsorb liquid solution adsorbents effective in removing gas pollutants from a gas, and wherein the exterior surface of the substrate covered by the filter layer is hydrophobic;
    means for realizing a flow of the gas along the filter layer of the filter element during operation; and
    a spraying arrangement for spraying a liquid on at least a portion of the filter layer of the filter element.

17. The device according to claim 16, further comprising a tank for containing liquid chemicals, wherein the spraying arrangement is connected to the tank.

18. The device according to claim 16, further comprising a timer for activating the spraying arrangement at a predetermined interval frequency.

19. The device according to claim 16, further comprising means for detecting an effectiveness of the gas purifying process, and for controlling the spraying arrangement to activate in response to a detection of the effectiveness below a predetermined reference value.

20. The device for purifying a gas according to claim 16, wherein the filter element is removably arranged in the device.

* * * * *